Patented Oct. 9, 1934

1,976,133

UNITED STATES PATENT OFFICE 1,976,133

PROCESS OF GRINDING PORTLAND CEMENT

Harry M. Larmour and Stephen C. Pierce, Jr., Merced, Calif.

No Drawing. Application September 28, 1931, Serial No. 565,700

3 Claims. (Cl. 106—25)

This invention relates to Portland cement and has for its objects an improved process of grinding such cement and the product of such grinding.

Modern development in Portland cement practice demands finer grinding, and it has been found that ordinary single grinding is not productive in the matter of producing cement of maximum quality and high early strength, and recourse has been made to a second or regrinding of the cement. Regrinding, however, as ordinarily practiced, has also failed to produce the results desired, due, we believe, to the fact that the high grinding temperature reached in the first grind has so reduced the water content that the second grind is ineffective by reason of the material coating and cushioning the mill and balls while much of it floats through the mill without having been acted upon by the grinding agents at all.

Attempts to overcome the trouble led to leaving out the gypsum content in the first stage of grinding, but then it was found impossible to carry on grinding on a commercial scale to a fineness of more than 88% passing the 200 mesh.

At the higher temperatures incurred in fine grinding the temperature of the discharging cement rises excessively, frequently reaching as high as 400 or more degrees F. and this has generally been considered the principal cause of coating and clogging of the mills as well as having a detrimental effect on the product. Besides this, at such high grinding heats the grinding efficiency of the mills is reduced about a third.

In order to keep down the grinding temperature resort has been made to cooling the mills with water sprayed over the outside of the mills, and in U. S. Patent No. 1,762,241 water was added to the material being ground within the mill to aid in reducing the temperature by evaporating the water and carrying it off as steam. This water was only added to the grind at a point where the temperature was already so high that chemical combination therewith could not take place, also in a very limited quantity, the patentee specifying that the water shall not exceed the amount up to a point where any absorption of it by the cement might take place.

After much investigation we have discovered that the grinding difficulties referred to may be eliminated by a modification in the grinding steps and so adjusting a direct feed of water to the material so that absorption will take place to a relatively considerable extent, and that the cement thus produced has exceptional qualities in controlled set and extremely low temperature rise during setting and hardening followed by high ultimate strength. We have found that absorption of water is essential in stabilizing the setting time, increasing plasticity of the resultant cement and in facilitating finer grinding of the material. We have further found that even sufficient water to render the clinker sticky and cause it to adhere to the grinding balls is essential to carry a hard burned clinker down into the grinding load and expose it to the proper abrasion necessary for reduction to the desired fineness. However, we have also found that an excess of water will completely destroy the grinding efficiency of the mill as it will coat the grinding balls to the extent that they become cushioned and will not grind.

We have also found that for best results both in grinding as well as in the finished product, the grinding with water should be carried out in at least two stages, the first, on the clinker without addition of any gypsum, and the second, after the addition of gypsum and/or other accelerating agents. Also, that the general temperature of the mill should be kept down by outward cooling of the same as by water spray or circulation. Also, as stated for maximum qualities in the finished product a specially treated clinker as described in our copending patent application should be used in carrying out the process.

Briefly stated, our process comprises grinding the clinker in at least two stages: The clinker from the cooler is introduced into the mill with an amount of water calculated on the temperature of the mill as indicated by the discharge temperature of the cement, and it is ground without gypsum preferably to a fineness of 90 to 100% passing a 200 mesh and which of course yields a considerable percentage much finer. The material at this stage may be termed our intermediate product or cement, and this is introduced into a second mill or further compartment of the first mill together with the desired amount of gypsum (to the standard specification limit of sulphur trioxide) and a further addition of water and reground to the fineness desired. The temperature of the mills is kept down with a water spray on the outside so that the temperature of the discharging cement will not exceed about 300° F., preferably 265° F. though it may be kept lower.

If a still finer cement is desired, another grinding stage may be used and water added as for the second stage. The gypsum addition, if used at all, should be held to the last stage of grinding, or it may be delayed until the final degree of fineness has been obtained and thereafter thoroughly mixed with the cement in the form of a fine powder.

The proper amount of water to add to the different grinding stages is a function of the temperature of the materials being ground and will change for different clinkers and different mills, but will run about 6 to 10 pounds of water per barrel of cement. The mill is first started without water addition and after running for a grinding period at the feed rate necessary for good fineness, the discharging cement temperature will rise to about 200° F. and at which temperature water is added to the grind in the mill approximating 6 pounds per barrel of cement. As the temperature continues to rise the water addition is increased up to about 10 pounds per barrel at about 265° F. and still more if the discharging cement gets hotter, for the first stage of the process. In the second stage we use about the same total amount of water but if gypsum is added this in itself contains about 20% of water, while some combined water is retained by the clinker from the first grind, we can therefore reduce the water feed in the second stage (using gypsum) so as to add from 2 to 4 pounds per barrel of cement, though occasionally it may be increased to 6 pounds if temperatures around 270° F. to 300° F. are reached in the first mill.

If no gypsum is used in the second grind, the water addition will be about 3 pounds more, or from 5 to 7 pounds per barrel.

The amount of water to be added to the clinker in the mill is best described as that amount which is just sufficient to maintain free grinding conditions near the discharge end of the mill and at the same time maintain clear conditions at the feed end of the mill. Too much water coats the feed end of the mill and too little coats the discharge end of the mill. We have found with the grinding units used that the amount of water added to the clinker to give free and clear grinding conditions, has given temperature ranges for the discharged cement as stated above. Too little water also will permit a large bulk of the clinker passing through the mill to float through on the grinding media.

In practice, the water addition can be judged by the sound of the mill. If the balls are ringing clear in the last two or three feet prior to discharge of the material, sufficient water is being used, and if the balls likewise ring clear at the feed end of the mill the water is not in excess.

The actual control of the water addition to the grind is maintained by passing the water through a vessel maintained at a constant level by means of a float valve and discharging the water by gravity to the clinker through one or more accurate orifices.

For very best results by our process, it is desirable to use a clinker which has been treated by special cooling and reburning either in part or all as the clinker of our copending application for patent filed March 19, 1929 under Serial No. 348,351, now U. S. Patent No. 1,849,492.

The entire process should be carried out as a unit in order to secure the maximum benefits as it is a matter of synchronizing the feed rate of the mill or mills and the outside water sprays to maintain a fairly uniform temperature of the discharging cement (to a point between 225-325° F.), and at the same time regulate the water addition to the grind within the mill to conform.

Summary: Our process of adding water in the quantity given to the first grind instead of gypsum makes it possible to easily get a fineness of from 95 to 100% passing the 200 mesh and finer, and which is commercially impossible to obtain in the ordinary grinding practice. The further addition of water as described results in a cement (also the intermediate product) containing from .5% to 4% of combined water. This water is of great importance, for experiments have shown us that cements retarded with gypsum with less than 1% water of combination were inclined to jell and hang set, those with 1½% were better, whereas with from 2 to 4% of water they were highly satisfactory in every test. And in Government tests of various cements recently made, the highest setting temperature reached with our intermediate product (no gypsum) was 14.7° C. in 11 hours, and a temperature of 36.1° C. in same period of time with the product of our complete process containing gypsum, all as against about an average of 58° C. in about 50 samples tested, thus showing the great advantage of our cement for use in pouring large blocks of cement in big dam construction or other uses where the dissipation of setting heat is in large concrete masses an important matter in the prevention of faults.

In regard to the combined moisture content of our freshly ground cement, it should be noted that in the ordinary method of grinding a very fine cement the heat of grinding would rise to such an extent that even if the clinker were initially wet, the moisture would be entirely dissipated unless more was added during the grinding process in accordance with our disclosure.

Our intermediate product (no gypsum) is in itself a slow setting cement, developing low heat, and ultimately high strength, and is resistant to both alkali and sea water due to the fact that the replacement of the sulphur compounds in the cement from gypsum cannot be effected, since the gypsum is absent. When reground with gypsum in the manner described it is considerably accelerated and its plasticity increased. The same holds true with additions of other accelerating agents added to the intermediate product. When the intermediate product is reground without gypsum but with water additions as described, to obtain a fineness of 96% or more passing the 200 mesh the product is a high early and ultimate strength cement with added plasticity.

Having thus described our improved process of cement grinding and the product thereof, we claim:—

1. The process of grinding Portland cement which comprises introducing water to the grind in the mill in amount sufficient to overcome evaporation loss through heat of grinding and retain from .5 to 4 per cent of the water in the finished product.

2. The process of grinding Portland cement which comprises grinding the clinker without gypsum and introducing water to the grind in the mill in amount sufficient to overcome evaporation loss through heat of grinding and retain from .5 to 4 per cent of the water in the finished product.

3. The process of grinding Portland cement which comprises grinding the clinker only with a quantity of water added, and thereafter regrinding the product together with gypsum and with additional water added under conditions insuring the retention of from .5 to 4 per cent of water in the finished cement.

HARRY M. LARMOUR.
STEPHEN C. PIERCE, Jr.